(12) United States Patent
Gille et al.

(10) Patent No.: US 7,118,635 B1
(45) Date of Patent: Oct. 10, 2006

(54) METHOD FOR PRODUCING TUNGSTEN CARBIDES BY GAS-PHASE CARBURIZATION

(75) Inventors: Gerhard Gille, Goslar (DE); Benno Gries, Wolfenbüttel (DE); Jörg Bredthauer, Bonn (DE)

(73) Assignee: H. C. Starck GmbH & Co. KG, Leverkusen (DE)

( * ) Notice: Subject to any disclaimer, the term of this patent is extended or adjusted under 35 U.S.C. 154(b) by 0 days.

(21) Appl. No.: 09/831,567

(22) PCT Filed: Nov. 3, 1999

(86) PCT No.: PCT/EP99/08373

§ 371 (c)(1),
(2), (4) Date: May 13, 2001

(87) PCT Pub. No.: WO00/29325

PCT Pub. Date: May 25, 2000

(30) Foreign Application Priority Data

Nov. 13, 1998 (DE) ................ 198 52 459

(51) Int. Cl.
*C23C 8/20* (2006.01)
*C23C 8/80* (2006.01)
*C01B 31/34* (2006.01)

(52) U.S. Cl. .................. 148/237; 423/440
(58) Field of Classification Search .......... 148/237; 75/240; 419/18
See application file for complete search history.

(56) References Cited

U.S. PATENT DOCUMENTS 4,172,808 A  10/1979  Böhm et al. ............... 252/443
4,851,041 A *  7/1989  Polizzotti et al. ............ 75/240
5,230,729 A   7/1993  McCandlish et al. ........ 75/351

FOREIGN PATENT DOCUMENTS

| DE | 19 16 340 | 4/1971 |
| EP | 0 286 294 | 10/1988 |
| FR | 2294133 | 7/1976 |

OTHER PUBLICATIONS

Acta Chim. Acad. Sci. Hung. 111 (month unavailablel) 1982, pp. 449-463, B. Vidick, J. Lemaitre and B. Delmon, Preparation of High Surface Area Tungsten Carbide.
Journal of Catalysis, 99, (month unavailable) 1986, pp. 415-427, Jacques Lemaitre, Benoit Vidick, and Bernard Delmon, Control jof the Catalytic Activity of Tungsten Carbides.
Journal of Catalysis, 99, (month unavailable) 1986, pp. 428-436, Benoit Vidick, Jacques Lemaitre and Bernard Delmon, Control of the Catalytic Activity of Tungsten Carbides.
Journal of Applied Physics, 21, Jun. 1950, pp. 595-599, B.E. Warren and B.L. Averbach, The Effect of Cold-Work Distortion on X-Ray Patterns.
Nava Alonso F.C. et al: "Tungsten Trioxide Reduction-Carburization with Carbon Monoxide-Carbon Dioxide Mixtures: Kinetics and Thermodynamics", Int. J. Miner Process, Jun. 1987, Bd. 20, Nr. 102, Seiten 137-151, XP000874467.

* cited by examiner

*Primary Examiner*—Harry D Wilkins, III
(74) *Attorney, Agent, or Firm*—Joseph C. Gil

(57) ABSTRACT

The invention relates to a method for producing wolfram carbides by gas-phase carburetion of wolfram powders and/or suitable wolfram precursor compounds in powder form at temperatures above 850° C. According to the method a $CO_2/CO$ mixture with a $CO_2$ content greater than the Boudouard equilibrium content corresponding to the carburetion temperature is used as carburetion gas phase.

6 Claims, 4 Drawing Sheets

METHOD FOR PRODUCING TUNGSTEN CARBIDES BY GAS-PHASE CARBURIZATION

The invention relates to a process for the direct preparation of carbides from tungsten-containing compounds by means of an atmosphere containing carbon monoxide and carbon dioxide.

The reaction of tungsten-containing compounds, particularly tungsten oxides, with carbon monoxide, and optionally a mixture of carbon monoxide and carbon dioxide at elevated temperature, is inherently well known.

U.S. Pat. No. 4,172,808 discloses a process in which $WO_3$ is converted to tungsten carbide powders at temperatures from 590° C. to 680° C. in a stream of carbon monoxide containing 5% to 10% carbon dioxide. The product still contains 2% oxygen so it has not reacted completely. Moreover, the product has on its surface an unspecified amount of free carbon. According to U.S. Pat. No. 4,172,808, the oxygen content is acceptable for catalyst applications and the superficial free carbon is required for a high catalyst activity. Tungsten carbide powders of this kind are unsuitable, however, for use as a hard solid in hardmetals because exact control of the carbon content to within a few hundredths of a percent is important in this case.

According to U.S. Pat. No. 5,230,729, gas phase carburization by means of a $CO_2/CO$ mixture is described for a partial stage of the preparation of fine-particle WC—Co powder for hardmetal production. According to this patent, the tungsten precursor compound $Co(en)_3WO_4$ is reduced initially in a hydrogen-containing stream of inert gas to highly porous Co—W metal, then carburized in the carbon monoxide gas stream to WC—Co and free carbon is then removed in a $CO_2/CO$ gas stream. Carburization temperatures from 700° C. to 850° C. are used in this case.

U.S. Pat. No. 5,230,729 also refers to a prior art according to which carburization to WC—Co powder with carbon activities from 0.35 to 0.95 was evidently carried out without the intermediate step of hydrogen reduction to Co—W. The fact that, in view of the substantial carbon monoxide decomposition brought about catalytically even at low temperatures due to the presence of cobalt, considerable absorption of carbon by the WC—Co starting substances takes place, leading to a metastable intermediate phase, is regarded as a disadvantage. As a result, very long reaction times are required.

In view of the absence of a catalytic effect of cobalt, the teachings regarding gas phase carburization for the preparation of WC—Co are not transferable to the preparation of WC powders.

Extensive research was disclosed by LEMAITRE, VIDICK, DELMON in Acta Chim. Acad. Sci., Hung. 111 (1982) pp. 449–463 and Journal of Catalysis 99 (1986) pp. 415–427 for the preparation of tungsten carbide powders by gas phase carburization, wherein both carbon monoxide and mixtures of carbon dioxide and carbon monoxide with carbon dioxide contents from 9% to 50% were used in the temperature range from 772° C. to 850° C. Both powder with high proportions of free carbon and highly under-carburized tungsten carbide powder or $W_2C$ powder were obtained; in some cases, reoxidation to tungsten oxide was also observed. A carburization temperature of 750° C. is regarded as optimal.

A combined summary of the prior art seems to be that gas phase carburization with pure carbon monoxide at temperatures above 850° C. leads to a coating of the precursor compound with graphite-like carbon, in view of the Boudouard equilibrium, with the result that the reaction is inhibited or brought to a standstill and hence long reactions which are not feasible, at least on an industrial scale, are required. On the other hand, the tests of the prior art disclosed seem to prove that, if $CO_2/CO$ carburization gas mixtures are used with $CO_2$ contents which, at carburization temperature, roughly correspond to the position of the Boudouard equilibrium or above, complete carburization is not possible.

It has now been found that substantially complete carburization of tungsten precursor compounds is obtained if, in the temperature range from 800° C. to 1,000° C., preferably 850° C. to 950° C., the carburization gas used has a carbon dioxide content, based on carbon dioxide and carbon monoxide, which is above the Boudouard equilibrium at carburization temperature, i.e. has a carbon activity of less than 1. If, however, the carbon dioxide content is too high, incomplete carburization will take place and even incomplete reduction. According to the invention, the carbon activity of the $CO/CO_2$ mixture should be preferably from 0.4 to 0.9, particularly preferably from 0.5 to 0.85.

The relationship between the relative proportions of CO and $CO_2$ in the carburization gas on the one hand and the carbon activity $a_c$ on the other hand is calculated from the following formula:

$$\ln a_c = \ln(p^2_{co}/p_{co2}) + 20715/T - 21.24,$$

wherein $p_{co}$ and $p_{co2}$ denotes the partial pressure of CO and $CO_2$ respectively in each case and T denotes the absolute temperature in K. The Boudouard equilibrium corresponds to a carbon activity $a_c=1$.

Due to the fact that the carbon activity during the process is kept below one, the separation of elemental carbon is rendered thermodynamically impossible, so the carbon content of the tungsten carbide obtained can be controlled precisely and in a reproducible manner. On the other hand, at temperatures above 800° C., preferably 850° C., the $CO_2$ equilibrium concentration is already so low that even if the equilibrium concentration is exceeded, complete and sufficiently rapid reduction and carburization of the tungsten precursor compound takes place. Particularly preferably, the $CO_2/CO$ partial pressure ratio should not exceed 1:8.

The process according to the invention is surprising against the background of the phase diagram of the $WO_3$—$WO_2$—W—$W_2C$—WC—C system disclosed in the publication Journal of Catalysis 99, p. 430, FIG. 5, because, according to the phase diagram, the phase $W_2C$ should form above 800° C. due to carburization with a $CO_2/CO$ mixture with a $CO_2$ content above the Boudouard equilibrium, and carburization to WC should not take place, at any rate within industrially feasible reaction times.

The present invention provides, therefore, a process for the preparation of refractory metal carbides by gas phase carburization of tungsten powder and/or suitable tungsten precursor compound powders at temperatures above 850° C., which is characterised in that the carburizing gas phase used is a $CO_2/CO$ mixture with a $CO_2$ content which is above the Boudouard equilibrium content corresponding to the carburization temperature.

The gas phase used is preferably one which, apart from unavoidable traces of nitrogen, argon and helium, is composed exclusively of carbon dioxide and carbon monoxide.

In order to maintain the preselected $CO_2$—CO ratio, carbon dioxide formed is drawn off during reduction and carburization. This may be carried out by introducing carbon monoxide into the carburization reactor as a function of the $CO_2$ content of the gas phase, or by flushing the reactor with the gas phase which has the preselected $CO_2$—CO ratio.

The carburization temperature is preferably from 900° C. to 950° C.

The $CO_2$ content of the $CO_2$—CO mixture is preferably below 8 mole % in the temperature range from 850° C. to 900° C. and below 4 mole % in the temperature range above 900° C.

Carburization at carburization temperature is carried out preferably over a period from 4 to 10 hours, particularly preferably over a period from 5 to 8 hours. Within the context of the process according to the invention, tungsten oxide powders are used preferably as the carbide precursor. The process according to the invention is particularly preferred if an upstream reduction of oxides or other precursor compounds to the metal is avoided.

If other tungsten precursor compounds are used, these are decomposed to the oxide preferably in an upstream calcining step. This has the advantage that the carburizing gas is not contaminated by decomposition products and may therefore be recycled.

According to a further preferred embodiment of the invention, the tungsten carbides obtained according to the process of the invention undergo a heat treatment at 1,150° C. to 1,800° C. after carburization. The temperature during the subsequent heat treatment is preferably 1,350° C. to 1,550° C., particularly preferably up to 1,450° C. The thermal after-treatment may be carried out, for example, in a sliding-batt kiln for a period from 1 to 60 minutes, preferably 25 to 50 minutes. Optionally, the heat treatment may be carried out with the addition of carbon-containing compounds.

Sintered parts with homogeneous structures and a high degree of hardness may be prepared from the fine-particle carbide powders obtainable according to the invention, without the need for intensive work up by grinding. Sintered hardmetal hardnesses obtained are superior to those of commercial grades with the same binder contents. This is also due to the fact that the carbides obtained according to the invention exhibit little agglomeration and are present in a virtually uniform particle size so that the tendency to secondary grain growth during sintering is insignificant. Particularly sinter-stable carbide powders are obtained by the thermal after-treatment because crystal lattice defects are largely removed by the thermal after-treatment The present invention also provides tungsten carbide powders with a fine primary grain, expressed as coherence length, and high crystal quality, expressed by the lattice strain in %, lattice strain and coherence length being determined according to B. E. Warren and B. L. Averbach, Journal of Applied Physics, 21 (1950), pp. 595–599. The tungsten carbide according to the invention is characterised by a relationship between coherence length x and lattice strain y according to the formula $$y<(-4.06*10^{-4} \text{ nm}*x+0.113)\% \tag{I}$$

Particularly preferred tungsten carbides according to the invention have a relationship between coherence length x and lattice strain y which fulfils the two conditions below:

$$y<(-2.5*10^{-4} \text{ nm}*x+0.1025)\% \tag{IIa}$$ and $$y<(-7.78*10^{-4} \text{ nm}*x+0.1395)\% \tag{IIb}$$

The invention is explained in more detail below on the basis of the attached Figures.

Particularly preferred tungsten carbides are characterised by the relationship between coherence length x and lattice strain y according to the formula $$y<(1-x^2/3600 \text{ nm}^2)^{1/2}.0.075\% \tag{III}$$

Tungsten carbides of this kind are obtained by heat treatment following carburization.

The invention is explained in more detail below on the basis of Examples.

EXAMPLES

Example 1

2 kg of $WO_3$ blue, 0.60 μm (ASTM B330), were heated to 500° C. in a sinter furnace under an $N_2$ atmosphere. The furnace was then evacuated and changed to $CO/CO_2$ process gas, the $CO/CO_2$ ratio being 97/3, and heated to 920° C. The carbon activity was 0.65 at reaction temperature. The $CO_2$ formed during the reaction was removed continuously and replaced by CO, the $CO/CO_2$ ratio of 97/3 being kept constant. The reaction was completed after 8 hours so the furnace could then be cooled under $N_2$ to room temperature. About 1.5 kg of powder were obtained, which could be identified on the basis of x-ray diffraction as pure-phase tungsten carbide. The powder was characterised by the following analytical values:

| | |
|---|---|
| $C_{total}$ = 5.90% | $C_{free}$ < 0.02% |
| O = 0.57% | N = 0.06% |
| FSSS = 0.47 μm (ASTM B330) | |

The % values given above and hereinafter refer to percentages by weight.

Example 2

2 kg of $WO_3$ blue were converted to tungsten carbide in a sinter furnace as described in Example 1, operations being carried out in this case at temperatures up to 700° C. under process gas during the cooling phase before the furnace was allowed to cool to room temperature under $N_2$:

| | |
|---|---|
| $C_{total}$ = 5.89% | $C_{free}$ < 0.02% |
| O = 0.41% | N = 0.07% |
| FSSS = 0.32 μm (ASTM B330) | |

Figure 2:
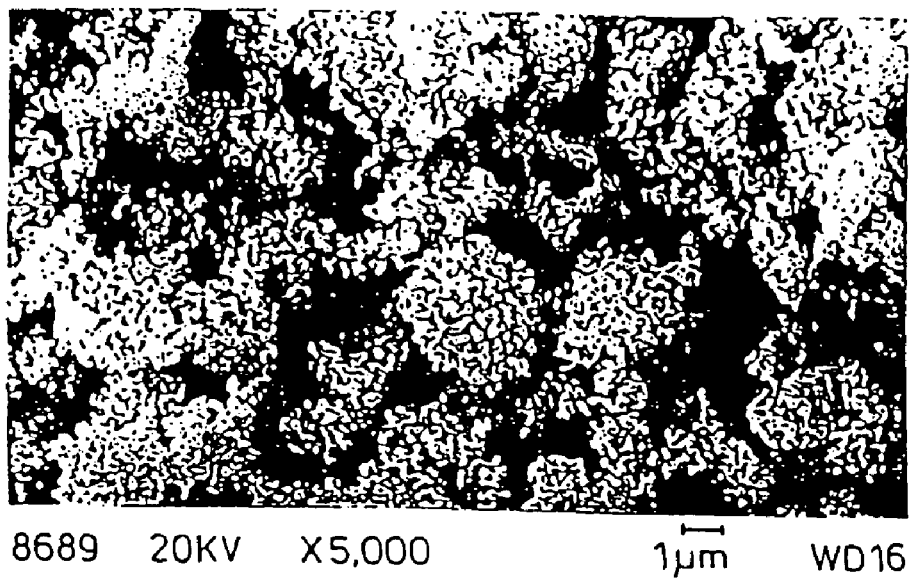
FIG. 2 shows an SEM photograph of a tungsten carbide powder prepared according to Example 2 below.

The powder thus obtained underwent a thermal aftertreatment in the sliding-batt kiln for 40 minutes at 1,400° C., the carburizing atmosphere in the furnace being sufficient for the carbon content of the tungsten carbide to approximate the theoretical. The powder obtained therefrom (FIG. 2) was characterised by the following analytical values:

$C_{total}$ = 6.08%          $C_{free}$ < 0.03%
O = 0.23%                    N = 0.05%
FSSS = 0.40 μm (ASTM B330)

Example 3

Figure 3:
FIG. 3 shows an SEM photograph of the tungsten carbide powder prepared according to Example 3.

Operations were carried out in a similar way to Example 2 except that fine-particle tungstic acid (FSSS=0.40 μm, according to ASTM B330) was used for carburization in this case. Initially, the material was calcined in situ at 500° C. for 3 hours, then operations were continued as in Example 2. On the basis of the SEM photograph (FIG. 3), it is evident that the powder exhibits little agglomeration.

$C_{total}$ = 6.08%          $C_{free}$ < 0.03%
O = 0.24%                    N = 0.05%
FSSS = 0.29 μm (ASTM B330)

Example 4

Operations were carried out in a similar way to Example 3 except that, prior to the high temperature stage, 0.6% $Cr_3C_2$ and, in order to guarantee the theoretical carbon content, a calculated amount of carbon was added to the carbide powder. The following powder characteristic data were obtained:

$C_{total}$ = 6.14%          $C_{free}$ < 0.02%
O = 0.36%                    N = 0.05%
FSSS = 0.37 μm (ASTM B330)

Figure 4:
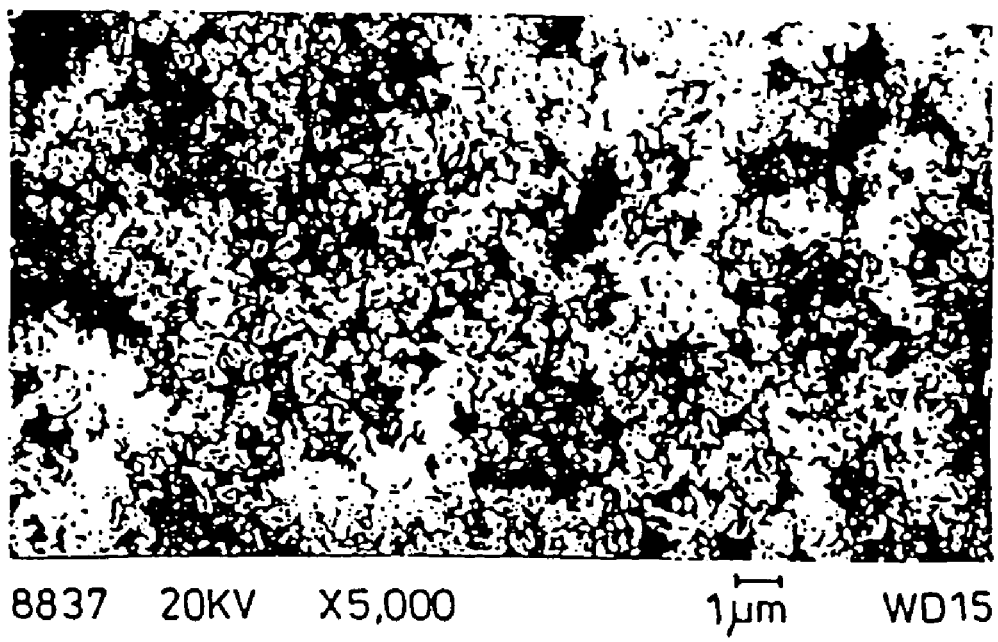
FIG. 4 shows an SEM photograph of the tungsten carbide powder prepared according to Example 4.

A fine-particle powder exhibiting little agglomeration was obtained (FIG. 4).

Example 5

Operations were carried out as in Example 3 except that the tungstic acid used had a particle size of 0.6 μm (measured by FSSS, according to ASTM B330). The powder obtained was hardly agglomerated at all and was present in fine-particle form. The following characteristic data were obtained:

$C_{total}$ = 6.07%          $C_{free}$ < 0.04%
O = 0.20%                    N = 0.05%
FSSS = 0.30 μm (ASTM B330)

Determination of Lattice Strain and Coherence Length

Figure 1:
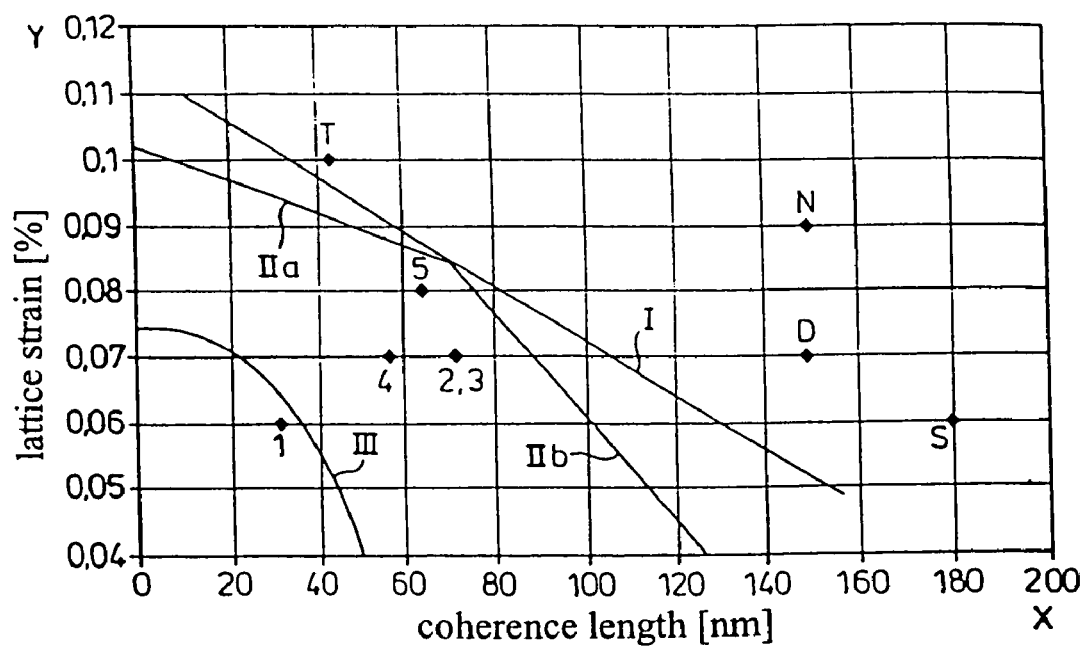
FIG. 1 shows the relationship between lattice strain and coherence length of the tungsten carbide powders preferred according to the invention, wherein the figures next to the measured values refer to the Examples given below, and the letters next to the measuring points outside the range according to the invention refer to products available on the market.

The lattice strain and coherence length of all the powder materials was determined according to the method of BE Warren and BL Averbach, J. Appl. Phys. 21 (1950) 595 and plotted in a diagram. In addition, this method was also applied to tungsten carbide powders of different origin (powders S, N, T and D) and plotted in the diagram (FIG. 1). The values are summarised in the Table below:

TABLE 1

| Material | Lattice strain (%) | Coherence length (nm) |
|---|---|---|
| Example 1 | 0.06 | 30.8 |
| Example 2 | 0.07 | 72 |
| Example 3 | 0.07 | 72 |
| Example 4 | 0.07 | 56.5 |
| Example 5 | 0.08 | 64.5 |
| S | 0.06 | 180 |
| N | 0.09 | 150 |
| T | 0.10 | 43.3 |
| D | 0.07 | 150 |

Hardmetal tests:

Hardmetal tests were performed on some materials, doping being carried out with $Cr_3C_2$ and VC, with a cobalt proportion of 10% in the hardmetal mixture. To this end the hardmetal mixtures were ground for 4 hours in hexane in the attritor (0.5 l; 300 g hardmetal mixture with 2,100 g of hardmetal balls, size 3–4 mm) and sintered under vacuum for 45 minutes at 1,380° C. Some hardmetal characteristic values are summarised in Table 2.

TABLE 2

| Example | Density g/cm³ | $H_{c(kA/m)}$ | $4\pi\sigma_s$ (μTm³/kg) | $HV_{30}$ (kg/mm²) | A-porosity |
|---|---|---|---|---|---|
| 1 | 14.48 | 41.4 | 16.6 | 1925 | A04 ISO 4505 |
| 2 | 14.39 | 42.2 | 15.4 | 2001 | A04 ISO 4505 |
| 3 | 14.42 | 42.2 | 15.3 | 2001 | A04 ISO 4505 |
| 5 | 14.44 | 43.0 | 14.5 | 2010 | A02–A04 ISO 4505 |

HC = magnetic coercivity, measured with a Foerster Koerzimat 1.096, in kA/m
$4\pi\sigma_s$ = magnetic saturation, measured with a Foerster Koerzimat 1.096, in μTm³/kg
$HV_{30}$ = Vickers hardness, 30 kg load, in kg per mm².

Figure 5:
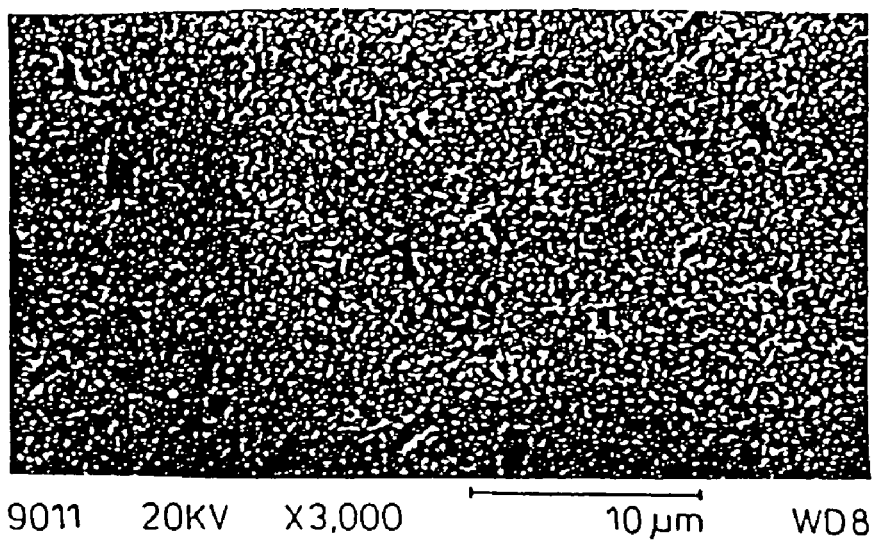
FIGS. 5 and 6 show SEM photographs of hardmetals prepared using tungsten carbide powders according to Example 1 and 3 respectively.
Figure 6:
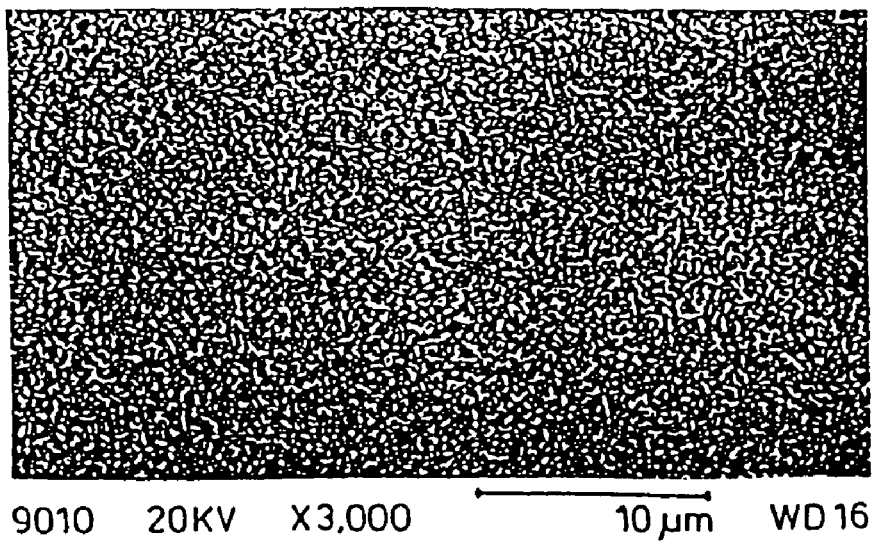

The carbide powder from Example 1 which was not stabilised at high temperature, had an increased tendency to secondary grain growth, whereas the other materials which were heat-treated, exhibited a homogeneous structure (FIGS. 5 and 6).

The invention claimed is:
1. A process for preparing tungsten carbide consisting of:
(a) carburizing a material selected from the group consisting of tungsten powder, tungsten precursor compound powder and combinations thereof, at a temperature ranging from 850° to 950°, and in the presence of a carburizing gas phase,
said carburizing gas phase comprising a mixture of CO and $CO_2$, said carburizing gas phase having a $CO_2$ content which is above the Boudouard equilibrium content corresponding to the carburization temperature, and
wherein the carburizing step is carried out with a carbon activity ranging from 0.4 to less than 1; and
(b) heat treating the tungsten carbide formed in step (a) at a temperature ranging from 1,150° C. to 1,800° C., and at a carburizing atmosphere sufficient for the carbon content of the tungsten carbide to approach the theoretical, thereby forming tungsten carbide.

2. The process of claim 1, wherein carburizing step (a) is carried out with a carbon activity ranging from 0.4 to 0.9.

3. The process of claim 1, wherein carburizing step (a) is conducted at a temperature of from 900° C. to 950° C.

4. The process of claim 1, wherein carburizing step (a) is conducted over a period ranging from 4 to 10 hours.

5. The process of claim 1, wherein the tungsten precursor compound powder is tungsten oxide powder.

6. A process for preparing tungsten carbide consisting of:
(a) carburizing a material selected from the group consisting of tungsten powder, tungsten precursor compound powder and combinations thereof, at a temperature ranging from 850° to 950°, and in the presence of a carburizing gas phase, said carburizing gas phase comprising a mixture of CO and $CO_2$, said carburizing gas phase having a $CO_2$ content which is above the Boudouard equilibrium content corresponding to the carburization temperature, and wherein the carburizing step is carried out with a carbon activity ranging from 0.4 to less than 1; and (b) heat treating the tungsten carbide formed in step (a) at a temperature ranging from 1,150° C. to 1,800° C., thereby forming tungsten carbide, wherein said tungsten carbide is characterized by a relationship between coherence length x and lattice strain y according to Formula (I):

$y < (-4.06\ 10^{-4}\ nm^{-1}x + 0.113)\%$.

* * * * *